Aug. 18, 1959

R. E. SPENCER ET AL 2,900,590

SERVO MECHANISMS

Filed June 14, 1957

*Inventors*
*R. E. Spencer*
*R. Voles*
By *Glascot Downing Seebold*
*Attys.*

United States Patent Office 2,900,590
Patented Aug. 18, 1959

2,900,590

SERVO MECHANISMS

Rolf Edmund Spencer, West Ealing, London, and Roger Voles, Chiswick, London, England, assignors to Electric & Musical Industries Limited, Hayes, Middlesex, England, a company of Great Britain Application June 14, 1957, Serial No. 665,863

Claims priority, application Great Britain June 16, 1956

5 Claims. (Cl. 318—448)

This invention relates to servo mechanisms, especially though not exclusively to such mechanisms which employ magslip resolvers or similar rotary transformers and are intended for the automatic control of machine tools.

In some automatic machine tools, the relative displacements between the tool holder and the work-carrier are automatically controlled in response to a programme of the co-ordinates of predetermined points, usually called reference points, on the profile which it is required to cut. In such cases, as explained for example in co-pending United States application Serial Number 524,720, difficulty may arise in taking account of the radius of the cutter, since the cutting angle may vary from one point to another on the profile and since the radius of the cutter may in practice differ significantly from its nominal value.

The invention described in the specification referred to above has the object of reducing this difficulty by providing a servo mechanism which is responsive to the co-ordinates of the points on the profile to derive increments in terms of the angle of cut (say $\theta$) and which when added to these co-ordinates, give the co-ordinates of the centre of the cutter.

Figure 1:
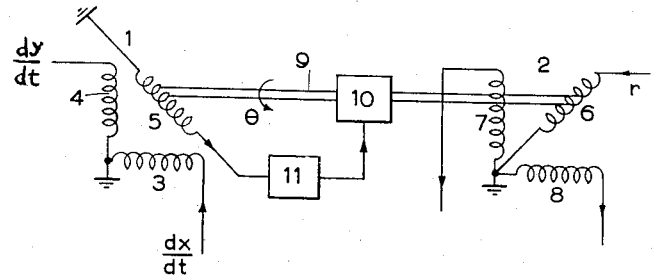

Figure 1 of the accompanying drawing shows a device which is generally of the form illustrated in Figure 4 of the aforesaid specification, this device comprises two resolvers 1 and 2, one having stator windings 3 and 4 in quadrature and a rotor winding 5 and the other having a rotor winding 6 and stator windings 7 and 8 in quadrature, the rotor windings 5 and 6 being mounted in the same shaft 9 which is driven by the servomotor 10. The rotor winding 5 is connected in a feedback loop via the amplifier 11 to the servomotor 10. The purpose of 10 is to rotate 9 to a position having an angle $\theta$ with reference to a datum direction, $\theta$ being the value of the cutting angle which a circular cutting tool has at any given instant. The arrangement illustrated in Figure 1 is applicable to provide compensation for the radius of a cutter in a machine controlled in the direction of two cartesian co-ordinates $x$ and $y$ and the stator windings 3 and 4 of the first resolver have co-phasal alternating signals applied to them, the amplitudes of which are proportional to the derivatives $dx/dt$ and $dy/dt$ of the two co-ordinates with respect to an independent variable, time and is herein denoted by $t$. The input to servomotor 10 is derived from an amplifier 11 which amplifies the signal picked up by the rotor winding 5 of the first resolver so that the servomotor 10 tends to rotate the shaft 9 to reduce the signal picked up by the winding 5 to zero. When this is so the condition that $$\frac{dx}{dt}\sin\theta = \frac{dy}{dt}\cos\theta$$

is satisfied and the shaft 9 is set to an angle $\theta$, the instantaneous cutting angle, the initial or datum angle of the shaft 9 being taken in the present example as that in which the windings 5 and 6 are in a position of maximum pick-up from the rotor windings 3 and 7 respectively. An alternating signal having an amplitude proportional to $r$, the radius of the cutter, is applied to the rotor winding 6 of the magslip 2 and when the shaft 9 has an angular displacement $\theta$ representing the cutting angle of the machine, co-phasal signals representing $r\cos\theta$ and $r\sin\theta$ the components of the required additional displacement for the cutter in the $x$ and $y$ directions are set up across the stator windings 7 and 8.

The accuracy with which the servomotor 10 sets up the cutting angle $\theta$ depends upon the sensitivity of the servo loop for the motor 10. This sensitivity is proportional to the loop gain of the servo system. The error signal $\epsilon$ generated in the rotor winding 5 is proportional to $$\frac{dx}{dt}\sin\theta - \frac{dy}{dt}\cos\theta$$

The differential gain $$\frac{d\epsilon}{d\theta}$$

of the servo loop is therefore proportional to $$\frac{dx}{dt}\cos\theta + \frac{dy}{dt}\sin\theta$$

and as $dx/dt$ and $dy/dt$ are in general continuously variable functions of the independent variable $t$, so also is $d\epsilon/d\theta$, therefore in the arrangements illustrated in the drawing, there is a disadvantage that the sensitivity varies in response to some agency outside the servo loop namely the arc length between successive reference points on the profile to be described and it is not possible to control the sensitivity simply as a function of $\theta$ as by means of a suitable correcting attenuator linked to the shaft 9.

A similar problem may be encountered in other servo arrangements employing magslips or rotary transformers and the object of the present invention is to reduce this problem by providing in a servo mechanism the sensitivity of which tends to vary in response to a variable independent of the controlled element, means for deriving a signal responsive to said variable and representing variations of sensitivity therewith, and means for controlling the sensitivity of said mechanism in response to said signal to reduce said variations.

In the case of a servo system employing a magslip or similar rotary transformer, as described above, the signal representing the sensitivity variations may conveniently be derived by an additional rotor winding on the transformer, with its axis at right angles to the normal rotor winding. If the derived signal is denoted by H, then in principle the desired control can be achieved by dividing the normal error signal of the servo mechanism by the factor H. This could apparently be achieved by employing this signal directly as a gain control signal for the servo amplifier but in practice it is difficult to obtain linear gain control that is a linear relationship between the gain and the control signal. To avoid this difficulty it is preferred, according to the invention, to provide means for similarly amplifying the error signal and the sensitivity signal and means for varying together the amplification of both said signals and in such manner as to tend to maintain the sensitivity signal, as amplified, equal to a reference value. If the sensitivity signal as amplified is maintained equal to this reference value (which can be taken as unity) then both signals must be amplified by a factor 1/H which is the required factor in the case of the error signal to eliminate the sensitivity variations. Moreover the control is not dependent on obtaining inverse linear gain control by the sensitivity signal, the accuracy being obtained by the expedient of negative feedback.

Figure 2:
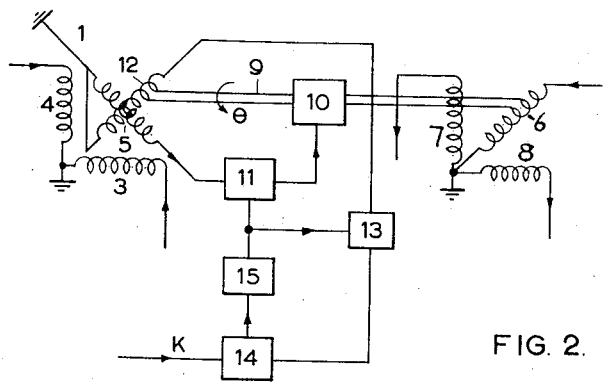
Figure 3:
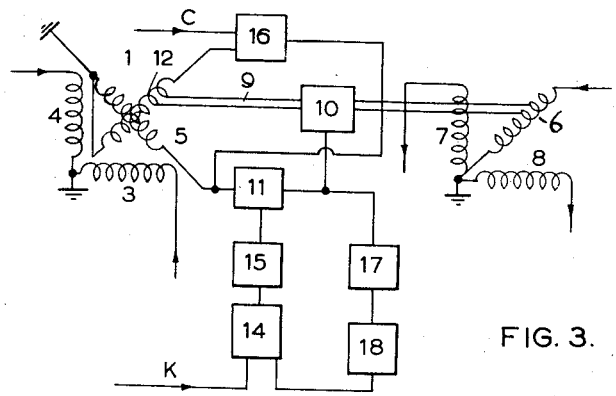

In order that the present invention may be clearly understood and readily carried into effect, the invention will now be described with reference to the accompanying drawing of Figure 1 which has already been described, and in which:

Figure 2 illustrates mainly in block form an embodiment of the present invention incorporated in an arrangement generally similar to Figure 1, and Figure 3 illustrates a modification of Figure 2.

Referring to Figure 2 the components 1 to 11 are similar to the components 1 to 11 of Figure 1 described above. The magslips for example may be known types of resolver magslips having quadrature stator windings. On the rotor upon which is mounted the rotor winding 5 of the resolver 1, there is also mounted a single rotor winding 12 which is substantially in space quadrature with the winding 5. The winding 12 provides a signal representing $$\frac{dx}{dt} \cos \theta + \frac{dy}{dt} \sin \theta$$

that is representing sensitivity or differential gain of the servo loop including the motor 10, namely the signal denoted by H in the foregoing. This signal is applied to a second amplifier 13 which is virtually the same as the servo amplifier 11 or at least the initial stage or stages of the amplifier 11. The output from 13 is connected to a comparator circuit 14 which may be of any conventional type, many forms of differencing circuits being known, to compare the amplifier output of 13 with a fixed reference signal $k$ which may for example be provided by a limited output from an oscillator. The difference signal provided by 14 is amplified in conventional manner in high gain amplifier 15 and used as a gain control input to the amplifiers 11 and 13 simultaneously. This gain control can be achieved for example by producing suitable variations of grid voltage on these amplifiers.

Assume for the sake of simplicity that the fixed reference signal $k$ applied to 14 represents unity, the amplifier 15 is included in a negative feedback loop for the amplifier 13 and therefore it may be said that the transfer function of the feedback path is 1/H. On the condition that the gain of the feedback loop is sufficiently high so that the difference signal from H does not differ substantially from zero, the amplifier 11 will then have an overall gain of 1/H and its output signal will be proportional to this value and since the amplifiers 11 and 13 are virtually identical the arrangement tends at all times to maintain the gain of the servo amplifier 11 at a value 1/H, required. In practice it may be difficult because of drift troubles in amplifiers to provide two amplifiers 11 and 13 which are identical and although they may not need to be absolutely identical for many purposes it may be advantageous to avoid the necessity for similar amplifiers completely. This inherent disadvantage in the circuit arrangement of Figure 2 can be overcome by employing a circuit arrangement such as shown in Figure 3.

Referring to the circuit arrangement of Figure 3, the components 1 to 11 are again similar to those described above with reference to Figures 1 and 2 and again, an auxiliary winding is provided on the rotor of the resolver 1 which is in phase quadrature to the normal rotor winding 5. The voltage signal proportional to the loop gain of the servo system which is derived from the additional winding 12 is fed as a modulating input to the conventional type of modulator 16 to modulate a pilot carrier signal C. The modulated pilot carrier signal which appears at the output of 16 is fed along with the main error signal into the servo amplifier 11 and it is to be understood that the frequency of the carrier signal is above the frequency band of the normal error signal for the servo system or at least sufficiently removed from its pass band. In addition to being coupled to the servo motor 10, the output of 11 is connected to a suitable pass filter 17 which filters the carrier signal from the output of 11 and this filtered signal is demodulated by a known form of demodulator 18. The recovered sensitivity signal derived from 18 is again applied to a comparator or differencing circuit 14 such as is used in Figure 2 and is compared with a reference signal $k$, the output being amplified by means of a suitable high gain amplifier 15 and used to control the gain of the servo amplifier 11. This circuit arrangement has advantage over Figure 2 that instead of using a sensitivity signal having a frequency equal to the normal servo error signal which requires two identical amplifiers, by converting the sensitivity signal to a different frequency the same amplifier 11 is employed to produce the same effect. Clearly the gain of the amplifier 11 tends to set up a value 1/H as before. Obviously the pilot carrier frequency should be as close as possible to the frequency range of the normal error signal but should be spaced from the harmonics associated with the error signal and moreover the pilot signal must be limited to such a peak value that will not cause saturation of the servo amplifier 11.

Clearly other arrangements of the present invention may readily be devised by persons skilled in the art. For example a system which would be capable of producing a gain in the servo amplifier of 1/H and which would not require a separate pilot frequency as does the example described with reference to Figure 3, might employ gates for alternatively admitting the sensitivity and error signals to the same servo amplifier, these gates operating in known manner to provide time division multiplexing.

In a further modification of the invention, being an extension of the use of gates, suggested above, the amplifier 13 of Figure 2 may be replaced by a single gate arranged to open and close alternately with a duty cycle of 1/H, the output of the gate being smoothed before being compared with the reference signal K, which in this case may be a D.C. signal. The duty cycle can be established by a multivibrator whose on-off ratio is controlled by the output of the amplifier 15 and whose frequency is high compared with the frequency of the error information signal. Preferably moreover the output of 15 is not employed to vary the gain of the amplifier 11 but is employed to operate a gate for the servo error signal to 11 with a duty ratio proportional to the output of the amplifier 15, the gated error signal being smoothed before amplification in 11 and subsequently used to drive 10 there again the aforementioned disadvantages of the circuit of Figure 2 are further reduced.

Although moreover the invention has been described with reference to a circuit arrangement for cutter radius compensation in automatic machine tools, it is clearly not limited to this application.

What we claim is:

1. A servo mechanism for setting a shaft to a position corresponding to the direction of a vector represented by the resultant of applied signals, comprising a resolver and a servo motor both coupled to said shaft, an amplifier connected in a feed back path from said resolver to said motor to cause said motor to drive said shaft towards a position defined by said applied signals with a sensitivity dependent on the applied signals, means for deriving a sensitivity signal representing the magnitude of said vector and gain control means responsive to said sensitivity signal for controlling the gain of said amplifier to tend to maintain said sensitivity constant.

2. A servo mechanism according to claim 1 comprising a further amplifier for said sensitivity signal, said gain control means being operative to similarly control the gain of both said amplifiers to tend to maintain the signal derived from said further amplifier at a predetermined value.

3. A servo mechanism according to claim 1 comprising a modulator for amplitude modulating a carrier wave with said sensitivity signal, means for applying said amplitude modulated carrier wave to said amplifier and means responsive to modulation amplitude of said carrier derived from said amplifier for varying the gain thereof to tend to maintain the modulation amplitude of said carrier at a predetermined value.

4. A mechanism according to claim 1, comprising common means for similarly amplifying said sensitivity signal and the signal applied from said resolver to said servo motor in time division multiplex and means for varying the amplification of both said last mentioned signals in such manner as to tend to maintain said sensitivity signal as amplified at a predetermined value.

5. A mechanism according to claim 1, comprising a first gate for said sensitivity signal and a second gate for the signal applied from said resolver to said servo motor and variable duty cycle means for similarly opening and closing both said gates to tend to maintain the average value of the gated sensitivity signal at a predetermined value.

References Cited in the file of this patent

UNITED STATES PATENTS 2,728,882    Cohen _____ Dec. 27, 1955